United States Patent [19]

Tickner et al.

[11] Patent Number: Re. 31,891

[45] Reissued Date of Patent: May 21, 1985

[54] PLATEN MODULE FOR COMPUTER FANFOLD REPRODUCTION

[75] Inventors: Donald R. Tickner, Pittsford; Robert E. Kalvitis, Fairport, both of N.Y.

[73] Assignee: Xerox Corporation, Stamford, Conn.

[21] Appl. No.: 354,684

[22] Filed: Mar. 4, 1982

Related U.S. Patent Documents

Reissue of:

[64] Patent No.: 4,264,200
Issued: Apr. 28, 1981
Appl. No.: 75,919
Filed: Sep. 17, 1979

[51] Int. Cl.[3] ..... G03G 15/00

[52] U.S. Cl. ..... 355/75; 355/3 SH; 226/74

[58] Field of Search ..... 355/75, 3 SH, 3 R, 16; 226/74, 75

[56] References Cited

U.S. PATENT DOCUMENTS

| | | | |
|---|---|---|---|
| 3,446,554 | 5/1969 | Hitchcock et al. | 355/75 |
| 3,623,806 | 11/1971 | Short | 355/14 SH |
| 3,804,514 | 4/1974 | Jasinski | 355/75 |
| 3,829,082 | 8/1974 | Hoyer | 271/4 |
| 3,994,426 | 11/1976 | Zahradnik et al. | 226/51 |
| 3,997,093 | 12/1976 | Aizawa et al. | 226/11 |
| 4,010,882 | 3/1977 | Turner | 226/75 X |
| 4,054,380 | 10/1977 | Donohue et al. | 355/14 |
| 4,079,876 | 3/1978 | Malachowski | 226/75 |
| 4,087,172 | 5/1978 | Van Dongen | 355/75 X |
| 4,191,467 | 3/1980 | Schieck | 355/75 |

*Primary Examiner*—R. L. Moses
*Attorney, Agent, or Firm*—Bernard A. Chiama

[57] ABSTRACT

An automatic electrostatographic duplicating machine in which computer fanfold documents are fed by an automatic handling means from a supply position above the machine platen to a second position overlaying the platen below the supply position by a tractor means having motor driven sprocket means operative to advance the document material, and control means for supplying control signals to said motor driven means to advance the document material continuously, intermittently, or to selected positions.

6 Claims, 7 Drawing Figures

PLATEN MODULE FOR COMPUTER FANFOLD REPRODUCTION

Matter enclosed in heavy brackets [ ] appears in the original patent but forms no part of this reissue specification; matter printed in italics indicates the additions made by reissue.

Companion patent applications to the above-entitled application and filed on even date herewith are as follows: Ser. No. 075,870, entitled Computer Fanfold Material Frame Selection; Ser. No. 075,865, entitled Duplexing in Computer Fanfold Reproduction; Ser. No. 075,920, entitled Speed Control for Computer Fanfold Reproduction; Ser. No. 075,866, entitled Stepper Motor Drive System in Computer Fanfold Reproduction; Ser. No. 075,918, entitled Job Recovery Enhancement in Computer Fanfold Reproduction; Ser. No. 075,868, entitled Sensor Controlling in Computer Fanfold Reproduction.

This invention relates to automatic electrostatographic duplicating machines and particularly to the improvement of handling continuous or web type document materials such as computer fanfold sheet material.

It is known to use electrostatographic reproduction machines as a dual-function machine for copying continuous length documents or individual documents by a single machine as described for example in U.S. Pat. No. 3,804,514, or in the copending patent application Ser. No. 40,334, filed May 18, 1979, and commonly assigned.

With the advent of the high speed electrostatographic duplicating machines having automatic computer fanfold document copying capability in addition to the standard document reproduction modes, there is need to permit the easy installation and removal of the fanfold handling apparatus and that the apparatus be compact and compatible with the host machine. To this end, the apparatus should comprise sub-assemblies which are individually mountable relative to the host machine, are adapted to accommodate the structural configuration thereof, and are arranged so that the web material is not displaced over too much area or requires too long a path of movement. It is also desirable that the fanfold handling apparatus be adapted to utilize all of the features that the host machine is capable of providing such as sorting, finishing and duplexing.

The general combination of an electrostatographic processor and a computer fanfold web handling apparatus is not new, having been described in U.S. Pat. Nos. 3,446,554 and 3,804,514, cited above, both being assigned to the assignee of the present invention. The latter patent illustrates the basic configuration of the Xerox duplicator presently in commercial use labelled the 7700 machine. In both of these arrangements, the fanfold material is stacked in a supply bin at one end of the machine, directed across the entire top side and then collected after copying of the material into a receiver basket at the other end of the machine. In addition, neither of the disclosures, or the machine itself is provided with innovative operative features which optimize and simplify total operation, or which extends the versatility of the machine.

Another patent disclosing an apparatus for moving computer fanfold material across the platen of a copying machine is U.S. Pat. No. 3,994,426. This disclosure is directed to a drive mechanism which provides the total system with the capability of forward and reverse movements of the material as well as continuous or segment by segment driving action.

In U.S. Pat. No. 3,997,093, a computer fanfold material handling apparatus for use with a copying machine is disclosed as having a web material conveying arrangement wherein the material is directed across a platen and use is made of a tension roller to permit reverse movement of the material.

In the arrangement of the present invention, an individually mountable platen module is applied to the platen of a commercial copying machine and is devised so that the input stack of the web material to be copied is positioned vertically above the platen. Guide means direct the material from this position to the platen whereat copy takes place. The guide means is devised so as to be foldable to a position inside the module for compactness and easy removal. The guide also permits the application of a forms overlay to the platen below the web material. There is also provided a tractor module which is individually mountable upon the host machine and a guide means is devised to integrate the introduction and movement of the web material from one module to the other.

It is therefore the principal object of this invention to incorporate a new and improved computer fanfold handling apparatus into a conventional electrostatographic duplicating machine which can be easily assembled and removed relative to the host machine.

It is a further object of the present invention to enable the copying of continuous document material on a high speed electrostatographic duplicating machine simply and efficiently.

It is a further object of the present invention to enable copying continuous type document material on a high speed automatic electrostatographic duplicating machine by rapid set up and take down of modular units in a simplified manner.

These and other objects of the invention will become more apparent upon considering the following description which is to be read in conjunction with the accompanying drawings wherein.

Figure 1:
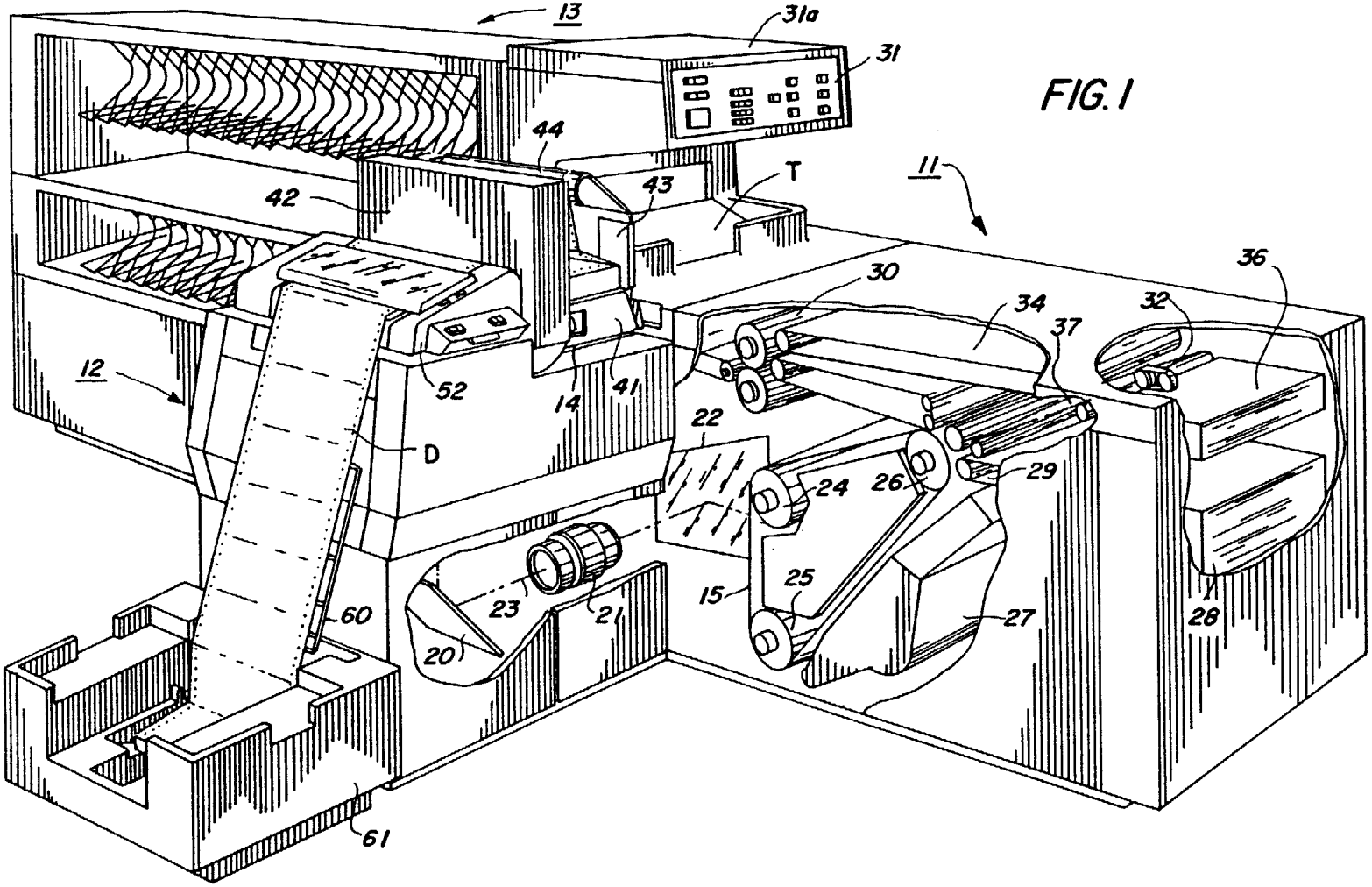
FIG. 1 is a perspective view of a duplicating system incorporating a computer fanfold material handling apparatus according to the present invention.

For a general understanding of reproduction machine with which the present invention may be incorporated, reference is made to FIG. 1 wherein components of a typical electrostatographic printing system are illustrated. The printing system is preferably of the xerographic type as one including a xerographic processor 11, a document handling apparatus 12, and a sorter arrangement 13. Preferably, the printing system 11, 12 and 13 is the commercial embodiment of the Xerox machine model 9400 which utilizes flash, full frame exposure, for very high speed production. As in all xerographic systems, a light image of an original to be reproduced is projected onto the sensitized surface of a xerographic photosensitive surface to form an electrostatic latent image thereon. Thereafter, the latent image is developed with toner material to form a xerographic powder image corresponding to the latent image on the photosensitive surface. The powder image is then electrostatically transferred to a record material such as a sheet or web of paper or the like to which it may be fused by a fusing device whereby the powder image is caused to adhere permanently to the surface of the record material.

The xerographic processor 11 is arranged as a self-contained unit having all of its processing stations located in a unitary enclosure or cabinet. The processor includes an exposure station at which a conventional document to be reproduced is positioned on a glass platen 14 for projection onto a photosensitive surface in the form of a xerographic belt 15. The document or set of individual documents is selectively transported by the document feed apparatus 12 including a transport belt from the beginning of the set of sequenced documents in the apparatus to the platen for exposure and then returned on completion of the exposure until the entire stack has been copied, at which time the document set handling cycle may be repeated indefinitely as described in U.S. Pat. No. 3,829,082 entitled "Automatic Document Handler" and commonly assigned with the present invention.

Imaging light rays from the document which is flash illuminated by suitable lamps are projected by first mirror 20 and a projection lens 21 and another mirror 22 onto the xerographic belt 15 at the focal plane for the lens 21 along a path indicated by dotted lines 23.

The xerographic belt 15 is mounted for movement around three parallel arranged rollers 24, 25, and 26 suitably mounted in the frame of processor 11. The belt is continuously driven by a suitable motor (not shown) and at an appropriate speed. The exposure of the belt to the imaging light rays from the document discharges the photoconductive layer in the area struck by light whereby there remains on the belt an electrostatic latent image corresponding to the light image projected from the document. As the belt continues its movement, the electrostatic latent image passes a developing station at which there is positioned a developer apparatus 27 for developing the electrostatic latent image. After development, the powdered image is moved to an image transfer station whereat record material or sheets of paper just previously separated from a stack of sheets 28 and transported by a conveyor 29 to the transfer station is held against the surface of the belt to receive the developed powder image therefrom. The sheet is moved in synchronism with the movement of the belt during transfer of the developed image. After transfer, the sheet of paper is conveyed to a fusing station where a fuser device 30 is positioned to receive the sheet of paper for fusing the powder thereon. After fusing, the sheet is transported selectively to a catch tray T, the sorter 13, or finisher, (not shown) or the like, or, alternatively, transported back into the processor for duplexing, if so desired.

The processor 11 is under control of a programmer 31 which permits an operator various options: to turn the entire system ON or OFF; to program the reproduction system for a desired number of reproductions to be made of each original document sheet, fanfold frame or panel; to select one of many different copy reduction sizes; and to select whether simplex or duplex copies are to be made. If the duplex copying mode is selected, each sheet of copy paper bearing an image and which has passed through the fusing apparatus 30 is transported to an auxiliary sheet feeding apparatus 32 by way of a transport 34. The feeding apparatus includes a sheet tray 36 which stores the one-sided copy sheets being until such appropriate time as determined by the programmer 31, the apparatus 32 commences transporting the stored sheets by way of a conveyor 37 which again presents the sheets to the xerographic belt 15 for permitting the transfer of developed images thereon to the second side of the sheets. The duplex copies are again transported to the fusing apparatus whereat the second sided images are fixed.

Further details of the processing devices and stations in the printer system are not necessary to understand the principles of the present invention. However, a detailed description of these processing stations and components along with the other structures of the machine printer are disclosed in U.S. Pat. No. 4,054,380 which is commonly assigned with the present invention and which is incorporated by reference herein.

In accordance with the present invention, the electrostatographic duplicating machine 11, 12, 13 exemplifying a variety of high speed duplicating systems with flexible and sophisticated features and options to automatically and conveniently process and manipulate copy sets by varied selective methods or sequences, for the purpose of receiving copies in any of numerous desired quantities, formats, enhancements, and arrangements, is adapted to be converted to copying computer fanfold document material or the like with relatively simple manual activity but with many convenient and automatic control features and much versatility. The resulting apparatus provides the full compliment of processing and manipulating features for copying from continuous web or fanfold document material as is afforded by the duplicating system initially in handling conventional individual documents, and document sets. Furthermore, as hereinafter described, new and unique control features are provided to extend and enhance the flexibility of the apparatus in the arrangement for copying from continuous document material.

Figure 2:
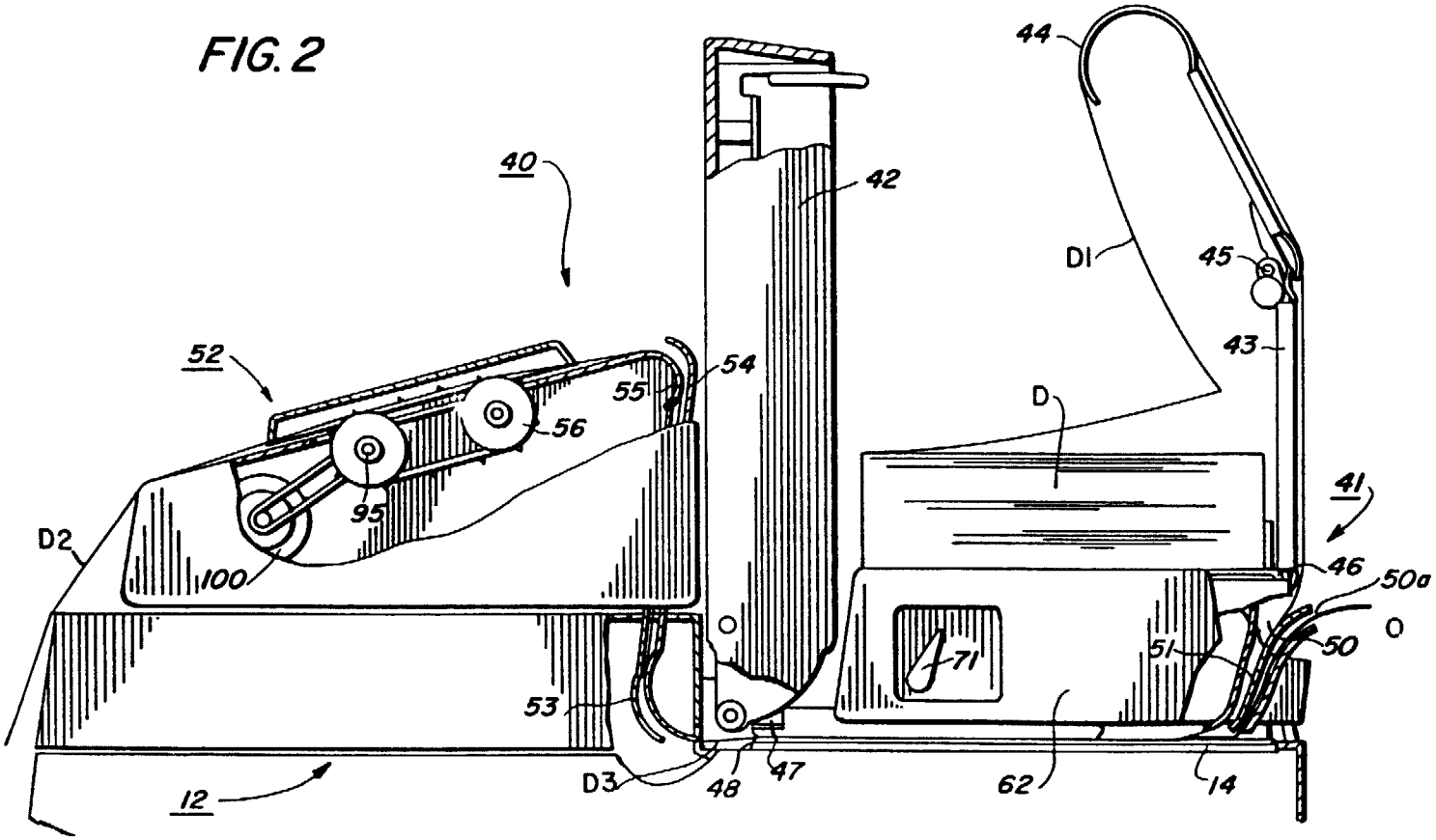
FIG. 2 is an elevational view, partly in section, of the fanfold web material handling apparatus as shown in FIG. 1.

Referring now to FIG. 2, there is shown a computer fanfold document material handling apparatus 40 comprising easily detachable modules adapted to be mounted relative to the conventional automatic document apparatus 12 with a minimum of structural or electrical modifications. The apparatus 40 includes an input continuous fanfold document material device, or platen module, 41 containing a supply of fanfold material D. The platen module 41 rests upon the glass platen 14 when the cover 42 of the document handler 12 is pivoted to a vertical position to allow access to the glass platen, and includes upwardly extending guide member 43 formed with an arcuate deflector member 44 around which the fanfold material D can be positioned from the top of the stack D. The deflector member 44 is pivoted at hinge 45 to the guide member 43 to permit folding together of these elements. The guide member 43 is also pivotally mounted on the module 41 to permit folding of both the deflector 44 and the guide member 43 within the confines of the module interior when the stack of material D has been removed and a support plate 46 for the stack of material has been moved therefrom.

Also arranged in the platen module 41 is a guide channel 50 through which the fanfold material is threaded and guided to condition it in overlying relationship with the platen 14. The guide channel 50 is partitioned at its entrance from a secondary channel 50a by an intermediate guide element 51 which electively allows for the insertion and correct positioning of forms overlay element O adapted for placement between the web material and the platen 14. During copying movement of the web, the overlay element O if electively inserted, remains stationary and the information on the overlay may be added to each frame section when being copied. It will be appreciated that platen 14 is available as a surface on which to position the module 41 when the cover 42 of the automatic document apparatus 12 is pivoted at right angles to the platen. A suitable stop 47 fixed to the machine frame on either side of the platen 14 serves to locate the module 41 relative to a registration edge 48 along which the leading fold edge of each panel of the fanfold material is positioned for copying purposes. It should be noted that the protruding registration edge 48 is automatically displaced below the glass platen surface by appropriate means to afford an open guide channel to the document web material D3 in transition.

With the platen module 41 as heretofore described arranged on the glass platen of a reproduction machine, and configured to support a stack of fanfold material in a vertically spaced position relative to the platen, there is no need for extending beyond the dimensional limits of the host machine exposure system in order to contain and transport a relatively long web material. This compactness and conservation of space is further enhanced by ultizing guides which are able to direct the web material efficiently from a holding station to a plane of utilization and which can be folded into a self-storing compact state totally within the confines of the platen module framework.

Returning attention to FIG. 2, the continuous document material D is advanced in a path across the glass platen 14, then under the glass platen cover 42 into another curved guide channel 53 (which receives the material D as it is threaded and transported from under the cover 42). The document material is directed upwardly by way of a smooth narrow channel within paper chute 54 and then redirected more horizontally over a curved surface 55 on the chute 54 so as to bring the material into conformal engagement with a pair of web material fanfold drive tractors 56 fitted within a tractor module 52. The sprocketed tractors propel the material D in indexing fashion across the surface of the module 52 and onto a steeply sloped exit guide 60 (shown in FIG. 1) and into an output restacking receiving module 61, which also serves to store the three heretofore described modules 41, 52, and 54 when same are removed from the host machine.

As will be seen hereinafter, the drive means for the material D is adapted for indexing movement so as to index each document frame or panel to proper orientation on the glass platen 14, which occurs when the leading edge of each panel is adjacent the registration edge 48.

Figure 3:
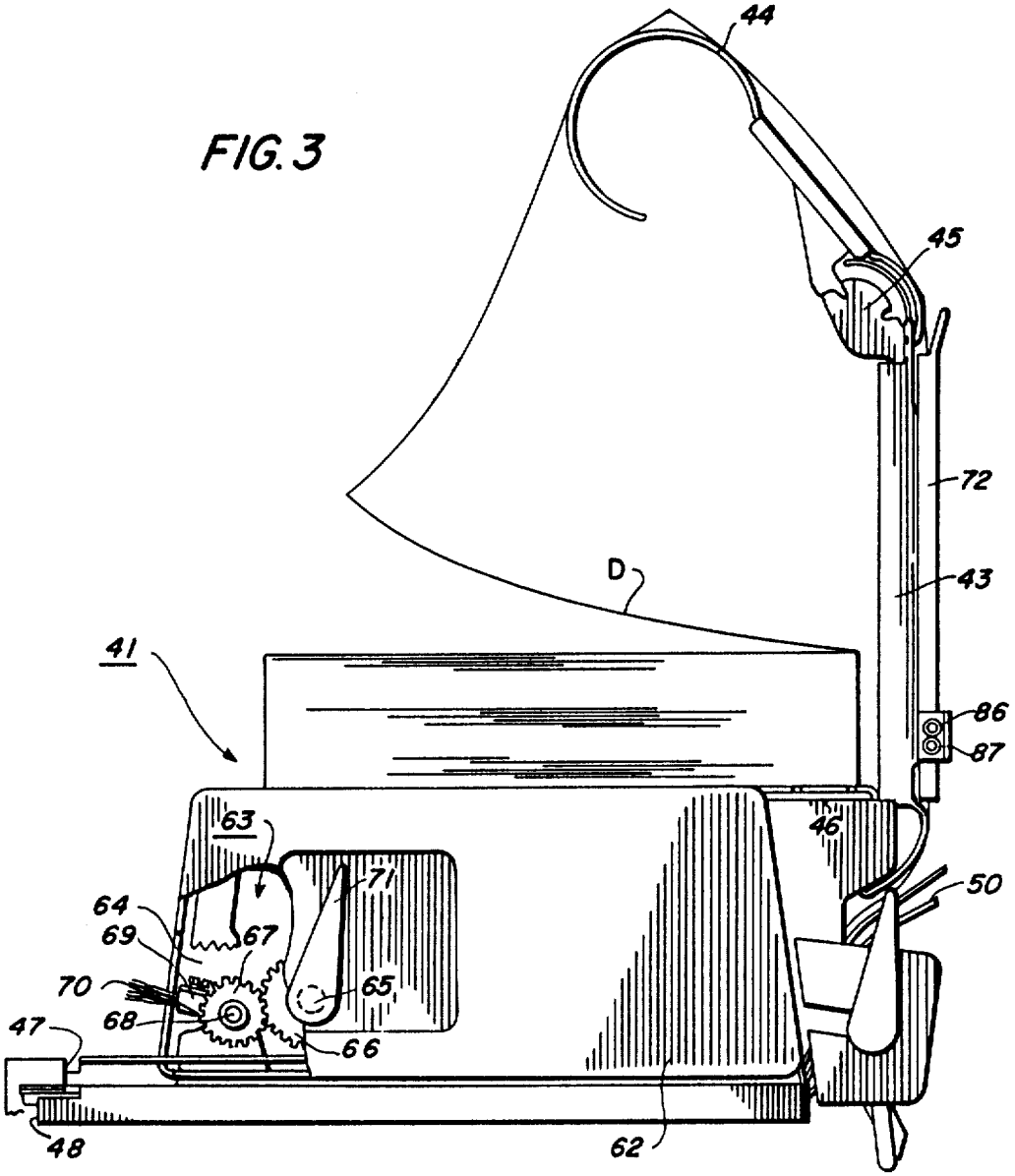
FIG. 3 is an elevational view partly in section of the platen module utilized in the material handling apparatus.

For more details of the platen module 41, attention is directed to FIG. 3 which illustrates a partial cutout of a side wall 62 to expose some of the details within the space thereof. As previously stated, the interior 63 of the module 41 is arranged to contain the deflector 44 and the guide member 43 when folded one upon the other and both together folded within the module.

Framework within the front side wall 62 and the other rear side wall 64 of the module supports a shaft 65 therebetween. To one end of the shaft 65 is attached a first gear 66 in cooperation with a second gear 67 mounted on a shaft 68 also supported between the side walls 62, 64. The shaft 68 has a bracket 69 secured thereto approximately midway between the side walls 62, 64 and so arranged as to support a small wire brush 70. The brush is shown in its upper inoperative position, such position provided to impart no resistance to the movement of the document material D for the case that it is manually manipulated through the document path channel, as during initial threading and setup. After the material D has been fully threaded through the fanfold document handling apparatus 40, and for the purpose of preparing the apparatus for normal automatic operation, the brush 70 is rotated downwardly and into contact with the back side of the document material by a handle 71 secured to the shaft 65 exterior to wall 62 of the module 41. The brush 70 in this orientation serves to apply appropriate normal force upon the document material so as to develop a positive and constant tension in the fanfold web material throughout the path from the glass platen 14 to and within the tractor module 52. The web tension so developed serves to maintain a constant and minimized length of web material within the confines of the web channel, between the actual location of document frame registration on the glass platen 14, the lead edge thereof aligned with registration edge 48, and the virtual registration line within the tractor module 52 defined by scribe lines thereupon.

Figure 4:
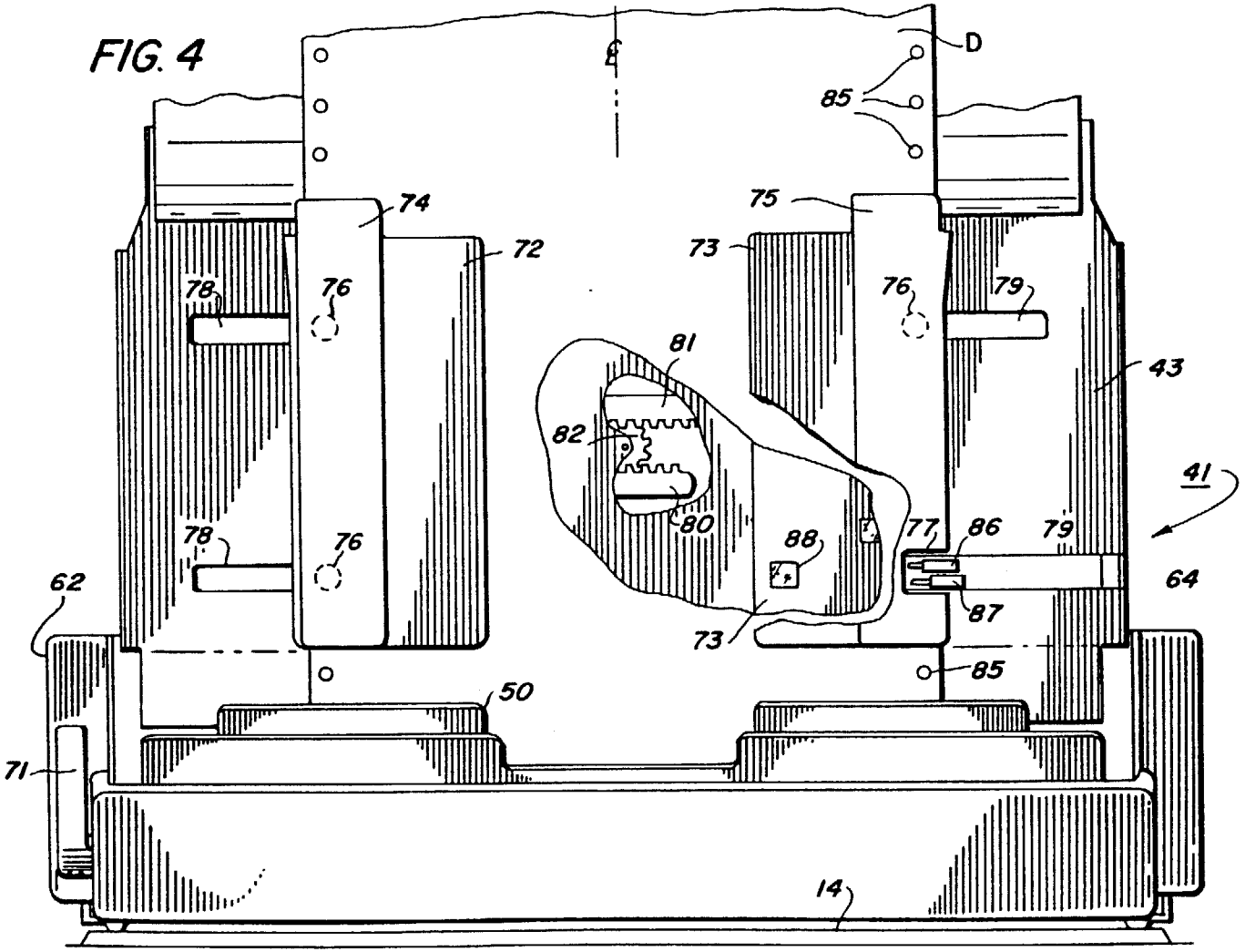
FIG. 4 is a rear elevational view, partly in section, of the platen module showing the document edge sensing arrangement.

Additionally, desirable lateral registration of the document material D within the platen module 41 as shown in FIG. 4, is served by incorporation of edge guiding devices 72, 73 which are adapted along inner surfaces 74 and 75 respectively, to contact and guide the edges of the document material D, as the same is initially threaded through the apparatus 40, and as the same is being transported across the platen 14 in the intervals of operative indexing of the same during copying operation. The guide devices 72, 73 comprise sheet metal plates bent back upon themselves to form closely positioned front and rear guide channel sections within and between which the edges and outermost surfaces of the material pass. Each of the guide channel members 72, 73 is outfitted with pin pairs 77 which are cooperable with slot pairs 78, 79 formed in the vertical guide member 43. The guide devices 72, 73 are laterally movable in unison toward or away from each other in such manner as to maintain respective equidistance from a desired centerline, the same coinciding, for example, with the optical centerline of the host duplicating machine by a suitable rack and pinion mechanism, all of the details of which are not shown. For one skilled in the art it is sufficient to indicate that such a rack and pinion arrangement may comprise a first rack 80 secured to the guide 72 and a second rack 81 secured to the guide 73 and having a pinion 82 mounted for rotation centrally within the member 43 and in cooperable engagement with the racks 80, 81. A suitable handle may be secured to the pinion 82 which when rotated will cause movement of the guides 72, 73 toward or away from each other depending upon the transverse width of the document material D. During operation, the operator will cause movement of the guides 72, 73 to such position as to cause their surfaces 74, 75 to contact the edges of the document material with a relatively light touch.

The platen module also carries sensing devices which may serve various functions with regard to detecting the presence, or inversely, the absence, end, or misalignment of the document material, and further, to detecting motion and velocity of same. These sensing devices applied in conjunction with logic provided to control and operate the fanfold document material handling apparatus 40, afford the continuous determination that: (a) the document material is properly threaded to commence a copying operation or job; (b) same is appropriately handled in precise registration and exact lateral (transverse) alignment in all intervals of operative indexing of same; (c) the trailing edge, or end, of a contiguous length of same has been registered, on the glass platen, and hence a terminating sequence for operatively indexing same, or else, a cycling down activity during a copying operation, or job, is initiated, or both are induced as is appropriate; and (d) in divergence form (b) above, motion of same has been slowed or stopped in the operative indexing interval, in the situation that the same might be torn, separated between frames, skewed, wrinkled, or otherwise damaged either prior to or during transition through the apparatus, and as a result operation is immediately terminated and a document handling jam condition is registered.

The sensing devices cooperate with the apertures 85 formed in the fanfold material D along the edge thereof which is transported between the elements of the guide 73. The sensing devices, labeled 86 and 87 in FIG. 4 may be of a suitable transmissive form which includes an LED and photo-transistor to sense the absence or presence of an aperture 85. The sensing of an aperture will produce an electrical signal in the photo-transistor which is suitably adapted to the controlling logic to establish the desirable algorithms previously ascribed to the control of the apparatus 40. The sensing devices 86, 87 serve the same purpose and two are shown laterally displaced rather than one in the event that the document handling material D has indications, perforations, or coding material which may appear as a sensed condition for the sensing devices, or the edge of the material wanders or strays laterally within guide elements 72, 73, and therefore cause the apertures 85 to shift from the path of either one of the sensors. Another sensing device 88 is mounted on the inner panel of the guide 73 and spaced inwardly from the apertured edge of the document material D so as not to be influenced thereby. The device 88 is preferably of the reflective type aligned in opposition to a specular reflective surface on the outer panel of guide 73 having a light source directed upon the material and a light sensitive element arranged to receive spectacularly reflected light rays if the material is absent.

Figure 5:
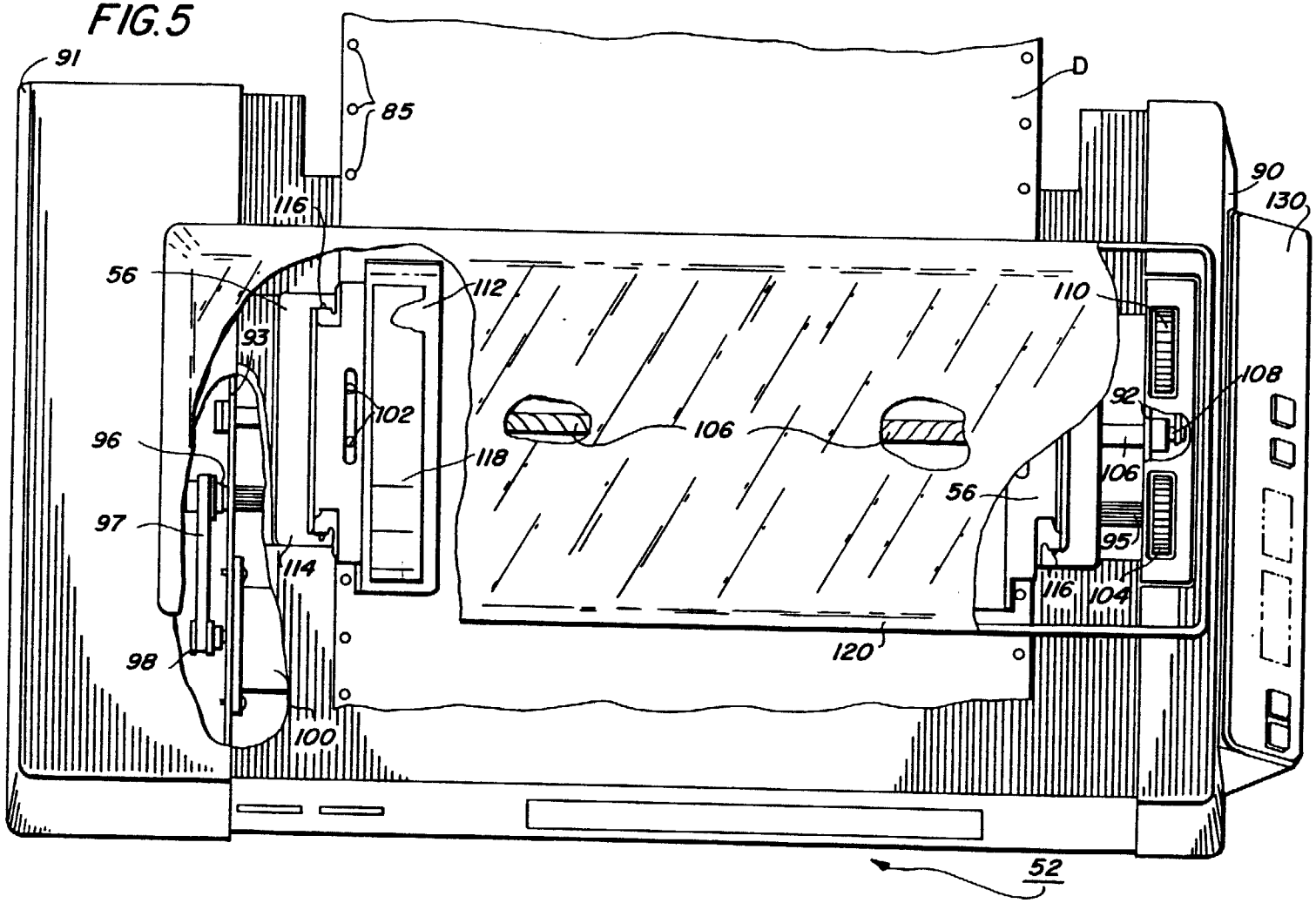
FIG. 5 is an elevational view, partly in section, of the tractor module in the material handling apparatus.

As shown in FIG. 5, the tractor module 52 is provided with exterior walls 90, 91 between which a frame having end walls 92, 93 is arranged. These end walls support a splined drive shaft 95 which supports each of the two tractor drive elements 56 thereon. One end of the shaft 95 extends beyond the end wall 93 and has a pulley 96 secured thereto for cooperation with a drive belt 97, which in turn is operatively connected to a pulley 98 secured to the shaft of a four phase, stepper motor 100. The motor 100 is suitably secured to the end wall 93 totally within the confines of the exterior walls of the tractor module.

Each of the tractors 56 is drivingly engaged with the shaft 95 which upon rotation produces drive movement of the belts 102 on the tractors. As known from use of the conventional tractors, the perforated edges of the fanfold document material D cooperates with sprocket teeth formed on the belts 102 for effecting movement of the web material during activation of the tractors. The shaft 95, as previously stated, is splined so as to permit driving relationship with the tractors regardless of their position upon the shaft 95. At the end of the drive shaft 95 remote from the drive end, and which is journaled in the end wall 92, there is secured a thumb wheel 104 which permits an operator to manually rotate the shaft and thereby the tractors. With this arrangement, the operator may manually thread the material D through the modules and may also register the panels of the material in proper position for indexing in accordance with registration marks inscribed upon the tractor top surfaces.

Figure 6:
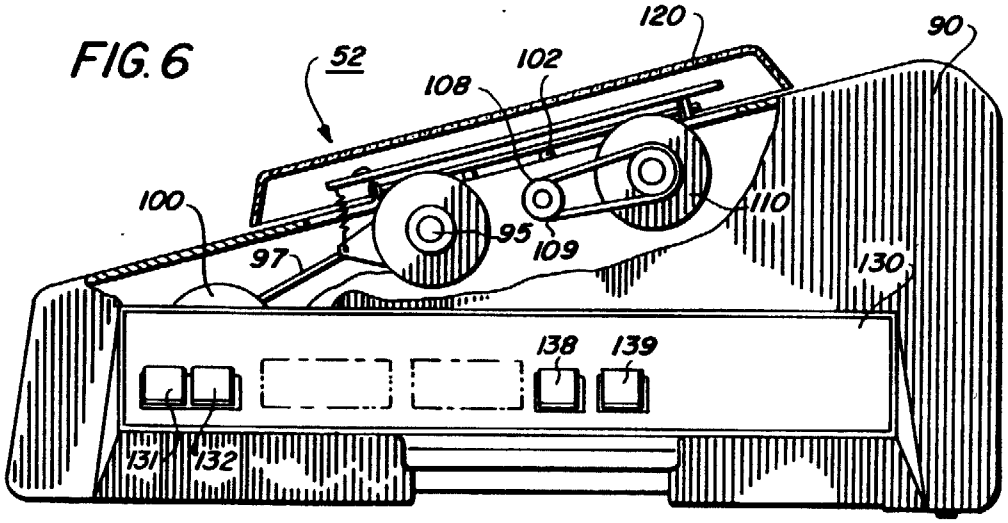
FIG. 6 is a plan view, partly in section, of the tractor module.

In the tractor module there are means provided for adjusting each of the tractors 56 toward or away from each other relative to a center line of the module in order to accommodate computer fanfold material of different widths. As shown in FIG. 6, the end plates 92, 93 also support a double equally pitched but oppositely threaded helical shaft 106 having its ends journaled in the plates. The end of the shaft 106 adjacent the thumb wheel 104 has secured thereon a pulley 108 connected by a belt 109 to a thumb wheel 110, suitably rotatably mounted on the end wall 92. By turning the thumb wheel 110 in either direction, an operator effects rotation of the double helical shaft 106 and consequently the inward and outwardly movement of the tractors 56. Each of the tractors is provided with guide plates 112 which are pivotally mounted relative to the base 114 of the tractor by means of a thin pivot rod 116 extending through the same. The guide plates 112 may be pivoted upwardly to expose the tractor belts 102 thus permitting the insertion of the teeth on these belts into the perforations of the computer fanfold material D.

There is also engraved on each of the guide plates 112 indicia 118 which the operator utilizes to position the leading edge of a frame of the fanfold computer material and which is calibrated in accordance with the vertical length dimension of the frame. If the operator utilizes a leader attached to or formed as a part of the computer fanfold material which is threaded through the entire apparatus as previously described, the leading edge of the leader may be positioned relative to the appropriate indicia 118 indicative of the size of the frames for the material to be copied. When so aligned, the dimensions of the guide elements previously described relative to the platen module and the tractor module are so dimensioned that the leading edge of a frame will be registered with the registration edge 48 of the platen module. Subsequent indexing of the computer fanfold material by the tractor module will for each indexed motion align the next succeeding lead edge of the next succeeding panel of the material D. The motor 100 is adapted to index the material D in half-inch steps on each pulse command since, the standard fanfold material is provided with sprocket openings 85 which are one-half inches between centers. The indicia 118 will permit the operator to select any fanfold frame length from 5.0 to 12.5 inches in half-inch increments. A dust cover 120 made of suitable transparent plastic is arranged to be removably positioned upon the structural elements of the tractor module and the drive elements therefor.

Figure 7:
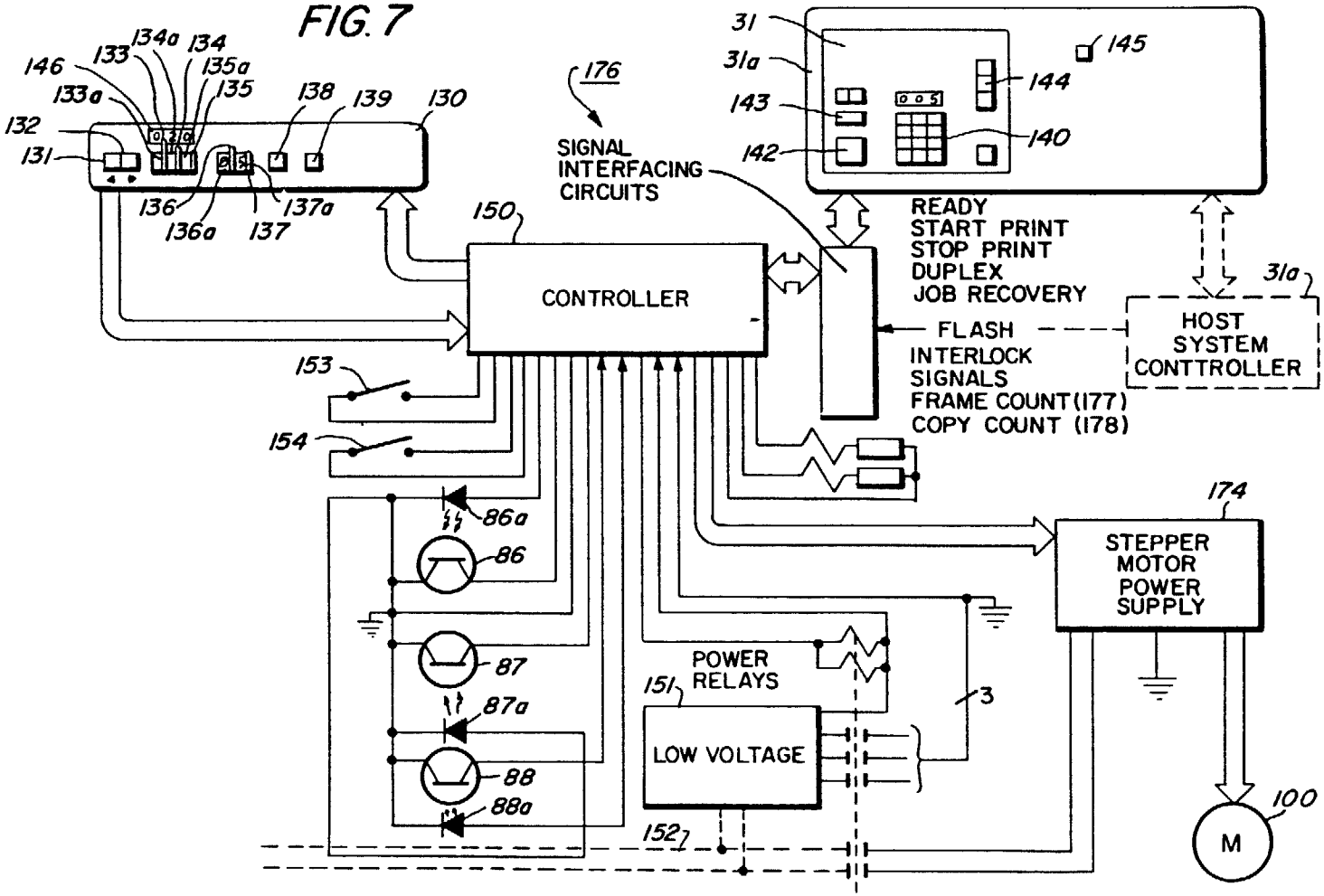
FIG. 7 is an electrical block diagram of the duplicating system.

In FIG. 7, there is disclosed a functional block diagram for the various operative control elements in the above-described computer fanfold material duplicating system. Referring to FIGS. 1 and 7, the control panel 31 for the reproduction system 11, 12 and 13 is functionally related to the fanfold material handling device 40 which includes a control panel 130 associated with the tractor module 52. The control panel 31 is provided with various push buttons which can be utilized by the operator to program the host xerographic processor for its many functions of operation. Since not all of the functions of the processor for the machine 11, 12, 13 are directly related to the control of and operative features for the apparatus 40, and whereas further description is disclosed in U.S. Pat. No. 4,054,380, heretofore commonly assigned, and hereby incorporated by reference only those control points which are essential to understand the salient features provided for the apparatus 40 will be described herein. The control panel 31 is the control panel for the Xerox commercial machine labeled 9400, and the processor 11 is the processor for this commercial machine, and references to functions within these are exemplary to assist understanding of the apparatus 40, and in no way restrict the general application of its unique features.

The operative controls associated with the panel 130 are as follows: an Advance form feed push button 131 and a Reverse form feed push button 132; three Feed Quantity selection lever wheels 133, 134 and 135; 0 to 9 indicating windows 133a, 134a and 135a associated with each of the lever wheels respectively; Form Length pre-selection lever wheels 136, 137; 0 to 9 indicating window 136a, and 0.0 and 0.5 (fractional) indicating window 137a associated with each of the lever wheels 136, 137 respectively; an Auto Feed push button 138; and a Single Feed push button 139.

The Advance button 131, as indicated by the small left-pointing arrow below the button, is adapted to energize the stepper motor 100 for advancing the fanfold web D through the tractor module 52, while in the Preparation or Job Recovery modes, which will be well defined later. The advance action is cooperable with the Form Length selector 136, 137 and with the Feed Quantity selector 133, 134, 135 by way of the control logic features as will be elaborated hereinafter. The provision of this feature permits the operator to skip large sections of the material D in a short period of time, when, for example, panels to be copied are spaced at great distances in a large size web, or desired panels are buried within the web. The Reverse button 132, as indicated by the right-pointing arrow below this push button, initiates the reverse movement of the fanfold web, and is cooperable with Form Length selector 136, 137. However, in this operation, the web D is moved one frame or panel of the material D per button press. This control feature is primarily used in the Job Recovery mode.

The Feed Quantity selector lever wheels 133, 134 and 135 permits the selection by the operator of the numbers of computer fanfold panels or frames desired to be either advanced, in cooperation with Advance 131, as for example, for positioning the initially desired frame into registration in preparation to produce copies thereof, or else copied, in cooperation with suitable selection of features on the control panel 31, and notably, Start Print 142, during a reproduction run or job. The wheel 133 controls the hundreds, the wheel 134 the tens, and the wheel 135 the units of a number to be placed in the feed quantity windows 133a, 134a, 135a, respectively, and hence, collectively provide a three-digit (decade) Feed Quantity selection entry and display system. As shown in the drawing, the numeral 025 is shown to indicate a typical number the operator has selected for the number of panels to be advanced or copies. Detailed description of the lever wheels is not necessary since these items are available commercially. All that needs to be said in regard to these wheels is that sequential actuation vertically from the "up" to the "down" positions will advance a rotatable counter wheel or indicator from 0 to 9 to indicate a count at the associated window. These lever wheels preset the feed quantity number in an alterable memory device in a programmer associated with the control panel 130.

The Form Length selector lever wheels 136, 137 together establish the length of a form or web panel or frame to be advanced on each controlling logic command. In the preferred embodiment, selectable lengths range anywhere between 5.0 and 12.5 inches inclusive, in half-inch increments, which provides adequate adaptability to the majority of commercially available and typical frame sizes for the fanfold computer material. While the lengths have been designated in whole and fractional inches, it will be understood that other lengths of different extent, range or resolution may be utilized, or lengths may be designated in the metric measuring system. Preferably, the wheel 137 cooperatively with display element 137a sets in the half-inch size of a fanfold panel and the wheel 136 cooperatively with display element 136a sets in the full inch lengths. As shown in the drawing, the numeral 08.5 is shown to indicate that a panel of size 8½ inches will be advanced for each controlling logic command.

The Auto Feed push button 138 permits the operator to select the Automatic Feed mode of operation for application in conjunction with the processor 11, wherein the fanfold material D advances one panel length automatically upon completion of the copy quantity sequence, as selected and determined on the processor control panel 31, and copying is continued. For example, if the number "5" is preset by the keyboard push buttons 140 on the panel 31, and Start Print button 142 thereon is depressed momentarily, the processor 11 will produce five copies of a document on the platen 14, which in this case is a panel or frame of the web material D. The web material will now be automatically advanced one panel length by the apparatus 40 and its associative controller 150, and additionally a command signal that is equivalent to Start Print is delivered from controller 150 to the host processor controller 31a, cooperatively linked to program panel 31, which causes the processor 11 to produce five additional copies, which are reproductions of the just registered new panel. This cyclic activity may be repeated indefinitely, with host processor control and operative slave to the controller 150 within the guest apparatus 40. However, the operating cycle can be terminated by several automatic or manually initiated events, as will be described hereinafter. The total activity just described, comprising a multiplicity of copies of a multiplicity of original documents (frames or panels of material D herein) is generally known collectively as constituting a "Job".

If the Single Feed push button 139 is actuated, a Single Feed mode is established wherein material D is automatically advanced one panel length upon completion of a specified copy quantity, whereupon copying activity is halted for the lack of a Start Print command signal emanating from the controller 150. However, in this situation, pertinent copy-run, or Job, status information is maintained in memory elements within each controller, 150 and 31a, as is appropriate for the eventual continuance of said Job as a unified whole, which will have, until its completion, the advantage and power of automatic verification of page and sequence intregrity that is within the capability of cooperating controllers 150 and 31a. Hence, this described mode effects a predictably occurring Job Pause feature, which may be willfully implemented by the operator at any time such may be advantageous, either initially prior to, or else during, any reproduction run or Job. In any such case, the Job may be continued by depressing the Start Print button 142, or else terminated, if so desired by depressing the Stop Print button 143.

As shown by general block diagram format in FIG. 7, control settings made by the operator by means of control panel 130 serves as a program input to a controller 150 which also is adapted to receive input from the control panel 31 and its concomitant controller 31a for the processor 11. The later inputs may comprise input by way of a start Run signal from the Start Print button 142, as previously stated, a stop Run signal from a Stop Print button 143, a Duplex mode input associated with the two-sided copy button 144, and a Job Recovery status signal related to the Job Recovery button 145. A digital display 146 on the panel 130 serves to indicate the number, or count, of the forms panel being copied at any time and counts up panels or frames initially from "1" as the material D is forwardly indexed during a Run mode. The significance and value of this Document Number display will be more fully realized with additional descriptions to be presented henceforth. Additional power is derived for the controller 150 and panel 130 from a low volage power supply 151 which, resident in processor 11, is connected to 115 volts ac power lines 152 therein. The low voltage supply 151 supplies the controller 150 and control panel 130 with various voltages as is necessary for the logic control circuits and elements, and for the various operative processing devices. Suitable voltages may include +24 volts dc, +20 volts dc, +12 volts dc, and 14 volts ac typical for such use.

Various interlock switches are associated with the controller 150 such as a switch 153 which may mounted in the platen module and be indicative that the brush 70 is in the "Up" position. Another interlock switch 154 may be mounted in the tractor module 52 to be actuated to an open condition in the event this module or some element thereof is not in correct position. In the event that either the switches 153, 154 is in the open position, the reproduction system cannot be initiated to an operative mode. Suitable panel display lights may be provided to indicate that the switches are open and thus inform the operator that the respective condition must be corrected.

Also serving as an interlock function is the monitoring of voltage across diodes 86a, 87a and 88a which are of light-emitting nature, and hence also afford illumination of the light sensitive phototransistors 86, 87, and 88,respectively which have been previously described herein. With regard to the final form sensor 88, in the event that the fanfold material has become broken or the last panel of the material D has moved across the sensor, an automatic Last form tracking logic circuit is enabled within the controller 150 which eventually will cause the processor to cycle down from Run mode, depending upon the predetemined number of remaining material panels between the sensor and the panel registration edge 48 on the platen 14, but only after the final copy of the last panel has been accomplished. This arrangement offers one means for automatically terminating a Job in either Automatic Feed or Single Feed Run modes previously described. The "Last-form tracking" logic is automatically programmed by decoded binary information derived from the Form Length selection.

From the foregoing description, it will be apparent that the present invention enhances the field of reproducing computer fanfold printout material by innovative arrangements of sub-assemblies utilized to transport the material relative to a host machine. While the invention has been described with reference to the structure disclosed, it is not confined to the details set forth; but is intended to cover such modifications, or changes as may come within the scope of the following claims.

What is claimed is:

1. In a reproduction machine having a document handling apparatus adapted to handle either individual documents, or document material in the form of a computer fanfold web consisting of a plurality of frame sections, the machine including an exposure platen on which said frame sections are positioned and a register element adjacent one side of the platen for locating an edge of each frame during copying thereof, the combination of:

a tractor module detachably mounted on the document handling apparatus adjacent the platen, a tractor motor and drive therefor mounted in said tractor module and actuable upon the web to advance the same and effecting the location of a corresponding edge of each of the frames being reproduced adjacent the registration element, a storage module removably mounted on the machine vertically above the platen and having a tray adapted to support a quantity of the folded web in readiness for the reproduction of frames therein, said storage module including a first guide means cooperable with the web for guiding the web during movement thereof from said tray, and between the same and the platen located therebelow, second guide means for receiving the web from said storage module and guiding the same into said tractor module for cooperation with the tractor motor for conveyance thereby.

2. The reproduction machine of claim 2 wherein said first guide means is articulated at least at one point to permit folding of a portion thereof and its containment within said storage module.

3. The reproduction machine of claim 1 including means on said storage module engageably with an element on the document handling apparatus for insuring the correct repetitive positioning of the module on the apparatus whereat corresponding edges of the frames of the fanfold web will be in registration with the register element.

4. The reproduction machine of claim 1 including hold-down means mounted in the storage module engageable with the web during movement thereof below the module for holding the web flat against the platen as the web is advanced.

5. In a reproduction machine having a document handling apparatus adapted to handle either individual documents, or document material in the form of a computer fanfold web consisting of a plurality of frame sections, the machine including an exposure platen on which said frame sections are positioned and a register element adjacent one side of the platen for locating an edge of each frame during copying thereof, the combination of:

a tractor module mounted on the document handling apparatus adjacent the platen, said tractor module including a tractor motor and drive therefor mounted in said tractor module and actuable upon the web to advance the same, a storage module mounted on the machine vertically above the platen and having a tray adapted to support a quantity of the folded web in readiness for the reproduction of frames therein, said storage module including a guide means cooperable with the web for directing the web during movement thereof from said tray, and between the same and the platen located therebelow, and a forms overlay element detachably mounted in said module at a position wherein a frame positioned on the platen to be copied is between the platen and the overlay element, and means for guiding the insertion and removal of the overlay element relative to its position within said module.

*6. In a reproduction machine having a document handling apparatus adapted to handle either individual documents, or document material in the form of a computer fanfold web consisting of a plurality of frame sections, the machine including an exposure platen on which said frame sections are positioned and a register element adjacent one side of the platen for locating an edge of each frame during copying thereof, the combination of:*

*a tractor assembly detachably mounted adjacent the document handling apparatus,*

*a tractor motor and drive thereof mounted in said tractor assembly and actuable upon the web to advance the same and effecting the location of a corresponding edge of each of the frames being reproduced adjacent the registration element,*

*a storage module removably mounted on the machine and having a tray positioned vertically above the platen adapted to support a quantity of the folded web thereon in readiness for the reproduction of frames therein,*

*a first guide means cooperable with the web for guiding the web during movement thereof from said tray, and between the same and the platen located therebelow,*

*a second guide means for receiving the web after the same has moved between the storage module and the platen and guiding the same to said tractor assembly and into cooperation with said tractor motor and drive for conveyance thereby.*

* * * * *